(12) United States Patent
Hawke et al.

(10) Patent No.: US 11,808,973 B2
(45) Date of Patent: Nov. 7, 2023

(54) OPTICAL FIBER SPLICE ENCAPSULATED BY A CLADDING LIGHT STRIPPER

(71) Applicant: nLIGHT, Inc., Vancouver, WA (US)

(72) Inventors: Ryan Hawke, Vancouver, WA (US); Teemu Kokki, Vancouver, WA (US); Shaun Hampton, Vancouver, OR (US); Chris Luetjen, Vancouver, WA (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 17/322,777

(22) Filed: May 17, 2021

(65) Prior Publication Data

US 2022/0113468 A1 Apr. 14, 2022

Related U.S. Application Data

(63) Continuation of application No. 16/550,058, filed on Aug. 23, 2019, now Pat. No. 11,009,657.

(60) Provisional application No. 62/729,266, filed on Sep. 10, 2018.

(51) Int. Cl.
*G02B 6/036* (2006.01)
*G02B 6/245* (2006.01)
*G02B 6/255* (2006.01)
*H01S 3/067* (2006.01)

(52) U.S. Cl.
CPC ............ *G02B 6/036* (2013.01); *G02B 6/245* (2013.01); *G02B 6/2558* (2013.01); *H01S 3/06708* (2013.01)

(58) Field of Classification Search
CPC ...... G02B 6/036; G02B 6/245; G02B 6/2558; H01S 3/06708
See application file for complete search history.

(56) References Cited

U.S. PATENT DOCUMENTS

| 3,891,302 A | 6/1975 | Dabby et al. |
|---|---|---|
| 3,976,356 A | 8/1976 | Jenkins |
| 5,222,795 A | 6/1993 | Hed |

(Continued)

FOREIGN PATENT DOCUMENTS

| CA | 2244572 A1 | 2/1999 |
|---|---|---|
| CA | 2468784 C | 1/2010 |

(Continued)

OTHER PUBLICATIONS

International Search Report and Written Opinion for International Patent Application No. PCT/US2019/048011, dated Nov. 7, 2019, 6 pages.

(Continued)

*Primary Examiner* — Ryan A Lepisto
(74) *Attorney, Agent, or Firm* — Stoel Rives LLP

(57) ABSTRACT

Spliced multi-clad optical fibers with a cladding light stripper (CLS) encapsulating the splice. The splice may facilitate conversion between two optical fibers having different architectures, such as different core and/or cladding dimensions. The CLS may comprise a first length of fiber on a first side of the splice, and a second length of fiber on a second side of the splice, encapsulating the splice within the lengths of the CLS. The splice may abut one or more of the lengths of the CLS, or may be separated from one or more lengths of the CLS by an intermediate length of a first and/or second fiber joined by the splice.

22 Claims, 5 Drawing Sheets

(56) References Cited

U.S. PATENT DOCUMENTS

| | | | |
|---|---|---|---|
| 5,321,257 A | 6/1994 | Danisch | |
| 5,633,966 A | 5/1997 | Nakaishi | |
| 5,790,735 A | 8/1998 | Oleskevich et al. | |
| 5,867,616 A | 2/1999 | Antos et al. | |
| 5,926,592 A | 7/1999 | Harris et al. | |
| 5,995,697 A | 11/1999 | Byron et al. | |
| 6,073,465 A | 6/2000 | Oleskevich et al. | |
| 6,278,827 B1 | 8/2001 | Sugiyama et al. | |
| 6,314,220 B1 | 11/2001 | Mossberg et al. | |
| 6,714,711 B1 | 3/2004 | Lieberman et al. | |
| 6,799,880 B2 | 10/2004 | Gozum et al. | |
| 6,925,230 B2 | 8/2005 | Kopp et al. | |
| 7,095,911 B2 | 8/2006 | Kopp et al. | |
| 7,748,913 B2 * | 7/2010 | Oba | G02B 6/2558 385/127 |
| 8,542,971 B2 * | 9/2013 | Chatigny | H01S 3/06704 385/134 |
| 8,885,993 B2 * | 11/2014 | Desbiens | G02B 6/02 385/29 |
| 8,948,218 B2 * | 2/2015 | Gapontsev | H01S 3/094007 372/6 |
| 9,122,009 B1 | 9/2015 | Griffin | |
| 9,136,663 B2 * | 9/2015 | Taya | H01S 3/06708 |
| 9,217,840 B2 * | 12/2015 | Fomin | G02B 6/4296 |
| 9,223,089 B1 | 12/2015 | Griffin | |
| 9,435,945 B2 * | 9/2016 | Gapontsev | G02B 6/0208 |
| 9,534,952 B2 * | 1/2017 | Creeden | G02B 6/245 |
| 9,547,121 B2 * | 1/2017 | Hou | G02B 6/2852 |
| 9,977,181 B2 | 5/2018 | Ikoma | |
| 10,348,051 B1 * | 7/2019 | Shah | H01S 3/06783 |
| 10,389,080 B2 | 8/2019 | Tanaka | |
| 10,802,209 B2 | 10/2020 | Wu et al. | |
| 2002/0131707 A1 | 9/2002 | Kopp et al. | |
| 2002/0186947 A1 | 12/2002 | Abe et al. | |
| 2003/0118265 A1 | 6/2003 | Kopp et al. | |
| 2006/0062518 A1 | 3/2006 | Galstian et al. | |
| 2006/0093012 A1 | 5/2006 | Singh et al. | |
| 2006/0215976 A1 | 9/2006 | Singh et al. | |
| 2007/0065083 A1 | 3/2007 | Singh | |
| 2007/0071389 A1 | 3/2007 | Yoon et al. | |
| 2007/0253669 A1 | 11/2007 | Singh | |
| 2008/0223822 A1 | 9/2008 | Singh | |
| 2010/0188735 A1 * | 7/2010 | Tamaoki | G02B 6/2551 385/96 |
| 2013/0013740 A1 | 1/2013 | LIU et al. | |
| 2013/0016742 A1 | 1/2013 | Sakamoto | |
| 2013/0308661 A1 | 11/2013 | Nishimura et al. | |
| 2014/0086526 A1 | 3/2014 | Starodubov et al. | |
| 2014/0211818 A1 | 7/2014 | Hou et al. | |
| 2014/0270637 A1 | 9/2014 | Desbiens et al. | |
| 2014/0363125 A1 | 12/2014 | Schwarzenbach et al. | |
| 2017/0110845 A1 | 4/2017 | Hou et al. | |
| 2017/0331244 A1 | 11/2017 | Karlsen et al. | |
| 2017/0371097 A1 | 12/2017 | Wu et al. | |
| 2018/0045895 A1 | 2/2018 | Lee et al. | |
| 2018/0059323 A1 * | 3/2018 | Rivera | G02B 6/2558 |
| 2019/0324220 A1 | 10/2019 | Tanaka | |
| 2019/0361171 A1 * | 11/2019 | Lee | G02B 6/03638 |

FOREIGN PATENT DOCUMENTS

| | | | | |
|---|---|---|---|---|
| CN | 101622030 A | 1/2010 | | |
| CN | 101622030 B | 12/2012 | | |
| CN | 103314254 A | 9/2013 | | |
| CN | 203595831 U | 5/2014 | | |
| CN | 104169763 A | 11/2014 | | |
| CN | 104749694 A | 7/2015 | | |
| CN | 104880764 A | 9/2015 | | |
| CN | 105676354 A | 6/2016 | | |
| CN | 105720463 A | 6/2016 | | |
| CN | 106025775 A | 10/2016 | | |
| CN | 206020714 U | 3/2017 | | |
| CN | 108152882 A | 6/2018 | | |
| CN | 108333672 A | 7/2018 | | |
| CN | 109416436 A | 3/2019 | | |
| CN | 109428256 A | 3/2019 | | |
| CN | 109541750 A | 3/2019 | | |
| CN | 110676677 A | 1/2020 | | |
| GB | 2188719 A | 10/1987 | | |
| GB | 2188719 B | 8/1990 | | |
| JP | 58001105 A | 1/1983 | | |
| JP | 2007527031 A | 9/2007 | | |
| JP | 2008198637 A | * | 8/2008 | H01S 3/06 |
| JP | 2011118208 A | 6/2011 | | |
| JP | 5113400 B2 | 1/2013 | | |
| JP | 2014010258 A | 1/2014 | | |
| JP | 2016029454 A | 3/2016 | | |
| JP | 2018124428 A | 8/2018 | | |
| JP | 6420163 B2 | 11/2018 | | |
| JP | 2018147624 A | 3/2019 | | |
| JP | 2019049698 A | 3/2019 | | |
| KR | 100405969 B1 | 11/2003 | | |
| KR | 20140141242 A | 12/2014 | | |
| KR | 102143426 B1 | 9/2015 | | |
| WO | 9706456 A1 | 2/1997 | | |
| WO | 2011067908 A1 | 6/2011 | | |
| WO | 2017191685 A1 | 11/2017 | | |
| WO | 2018003604 A1 | 1/2018 | | |
| WO | 2018075799 A1 | 4/2018 | | |
| WO | 2018138473 A1 | 8/2018 | | |
| WO | 2020138357 A1 | 7/2020 | | |

OTHER PUBLICATIONS

International Search Report and Written Opinion for International Patent Application No. PCT/US2019/052241, dated Dec. 19, 2019, 8 pages.

Non-Final Office action from U.S. Appl. No. 16/550,058, dated Jul. 1, 2020, 22 pages.

Supplementary European Search Report from European Patent Application 19862724.2, dated May 2, 2022, 10 pages.

Supplementary European Search Report from European Patent Application No. 19859683.5, dated Apr. 20, 2022, 6 pages.

Gao, et al.,"Multi-phase-shifted helical long period fiber grating based temperature-insensitive optical twist sensor", Jun. 19, 2014, Optics Express, 22, 13, 15697-15709. (Year: 2014).

Jebali M A, et al.,"All fiber cladding mode stripper with uniform heat distribution and high cladding light loss manufactured by COlaser ablation", Proceedings of SPIE; vol. 10513, Feb. 20, 2018, p. 105131 Q XP060100117.

Zhu, et al., "Mode-Couplings in Two Cascaded Helical Long-Period Fibre Gratings and their Application to Polarization-Insensitive Band-Rejection Filter", Apr. 17, 2018, Optics Communications 423, 81-85. *Year: 2018).

* cited by examiner

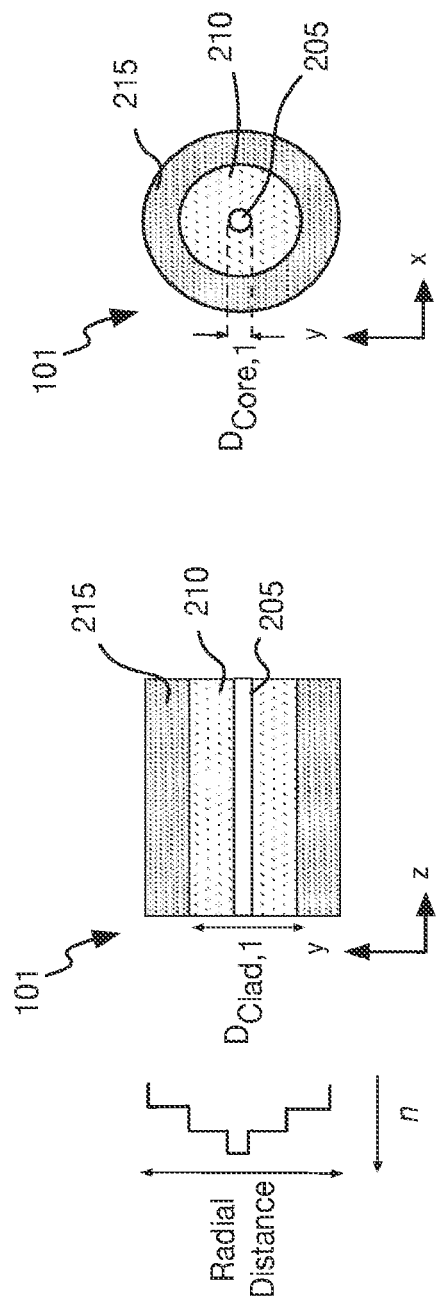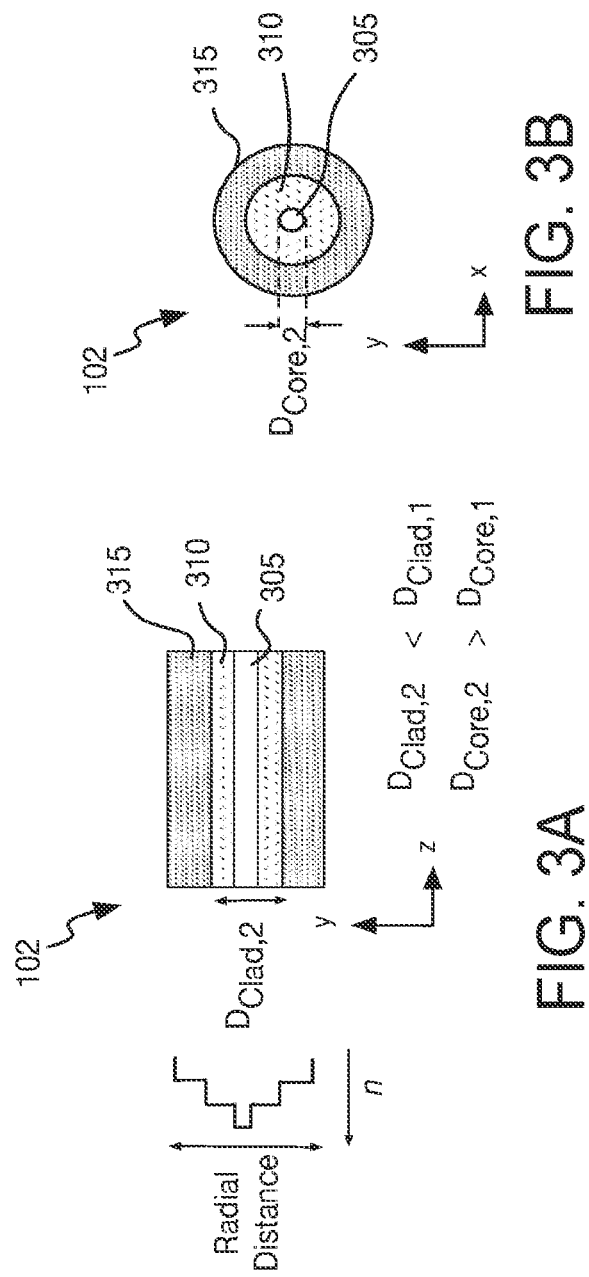

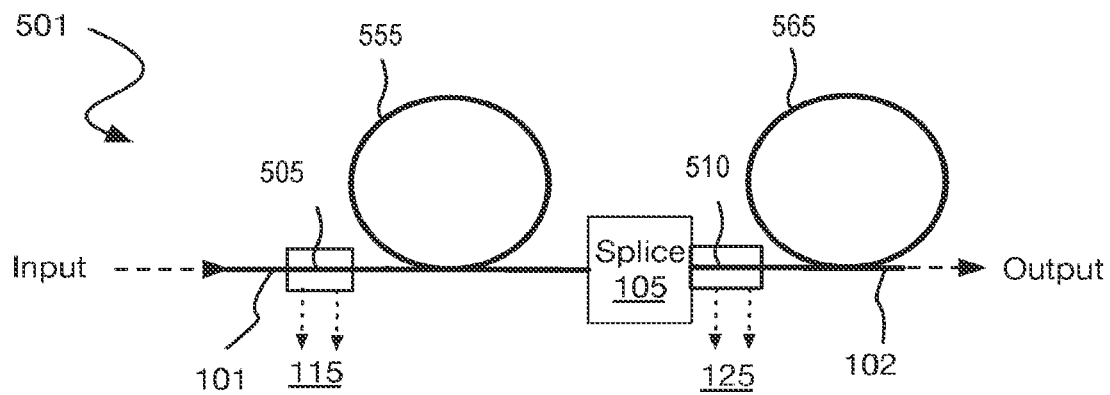
FIG. 5
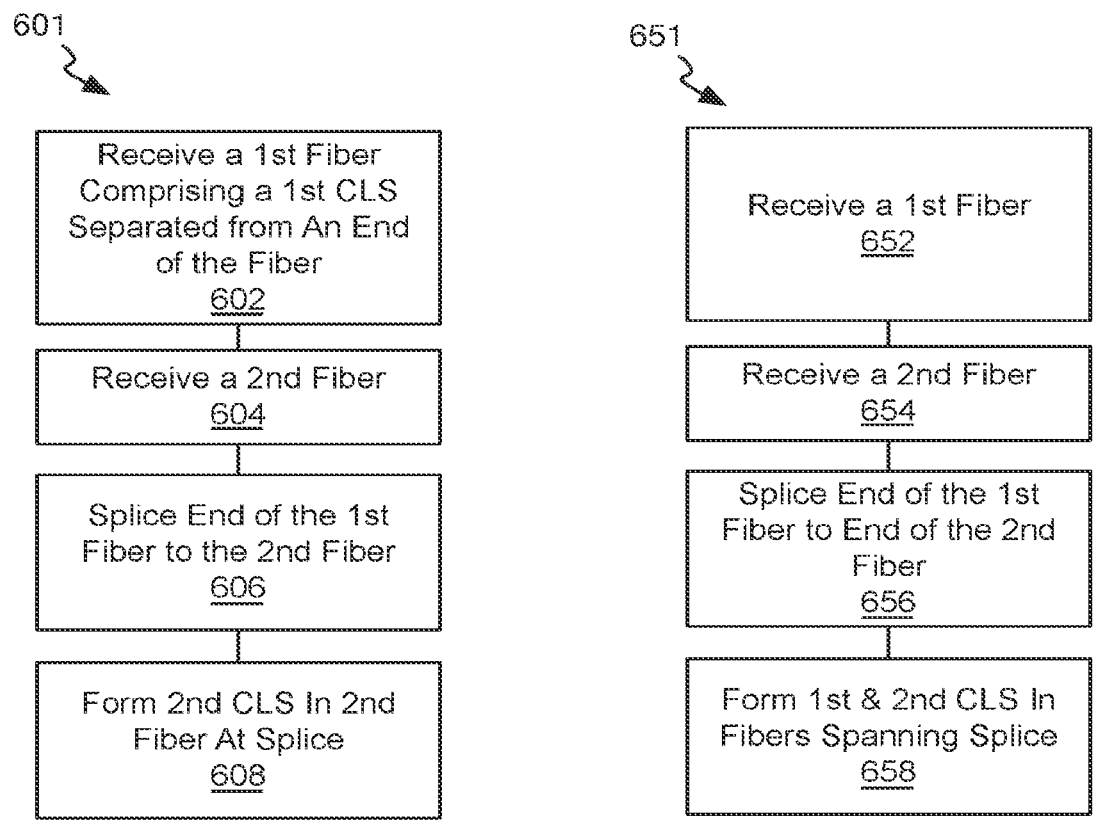
FIG. 6A
FIG. 6B

OPTICAL FIBER SPLICE ENCAPSULATED BY A CLADDING LIGHT STRIPPER

CLAIM OF PRIORITY

This application is a continuation of U.S. patent application Ser. No. 16/550,058, filed Aug. 23, 2019, which claims priority to U.S. Provisional Patent Application No. 62/729,266, filed Sep. 10, 2018, the entireties of which are herein incorporated by reference.

BACKGROUND

The laser industry continues to increase laser performance metrics, such as average power, pulse energy, and peak power. Increasing the power of beams conveyed within an optical fiber can render a system more sensitive to the length of fiber. For example, various mechanisms, such as stimulated Raman scattering (SRS) can become more significant at higher power levels, inducing a heightened sensitivity to fiber length.

Some fiber laser systems employ multi-clad fiber. In contrast to single-clad fiber having only a core surrounded by one cladding material, multi-clad fiber includes a core surrounded by two or more cladding material layers. Double-clad fiber (DCF), for example, has three layers of optical material including a core in which a source beam may propagate while pump light is to propagate within a first, or "inner" cladding that surrounds the core. The inner cladding may provide an index contrast with the core to guide the source beam and to also guide the pump light into the core where it may be absorbed by one or more dopants (e.g., *Ytterbium, Erbium*, etc.) along a length of the fiber. A second, or "outer" cladding further surrounds the inner cladding and may provide an index contrast with the inner cladding to guide the pump light. Typically, light that enters the outer cladding is lost from the system, however light within the inner cladding that the core does not absorb, or that has escaped the core, may be propagated over significant distances with a fiber system. Because the retention of "cladding light" within the inner cladding may be detrimental to system performance, "cladding light strippers" (CLS) may be employed within an optical fiber system to remove such cladding light.

A fiber system may include various fiber splices, which join separate fiber lengths end-to-end (e.g., fused). Significant power may be lost at a splice, depending at least in part, on the nature of the fibers spliced. Splice losses may be larger where there is a conversion from one fiber having a first set of properties to a second fiber having a second set of properties. For example, within a system employing DCF, splice losses may be larger where there is a conversion from one fiber having a first core and/or inner cladding dimension to a second fiber having a second core and/or inner cladding dimension. Techniques and fiber system architectures that mitigate problems associated with such fiber splices while minimizing fiber lengths may therefore be advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 2A and 3A are cross-sectional views of fiber with the optical fiber axis in the plane of the page, in accordance with some embodiments;

FIGS. 2B and 3B are cross-sectional views of fiber with the optical fiber axis perpendicular to the plane of the page, in accordance with some embodiments;

FIG. 5 is a schematic of a fiber system including a cladding light stripper (CLS) on both sides of a splice between two optical fibers of different architectures, in accordance with some embodiments;

FIGS. 6A and 6B are block diagrams illustrating methods of splicing two optical fibers, in accordance with some embodiments;

DETAILED DESCRIPTION

Figure 1A:
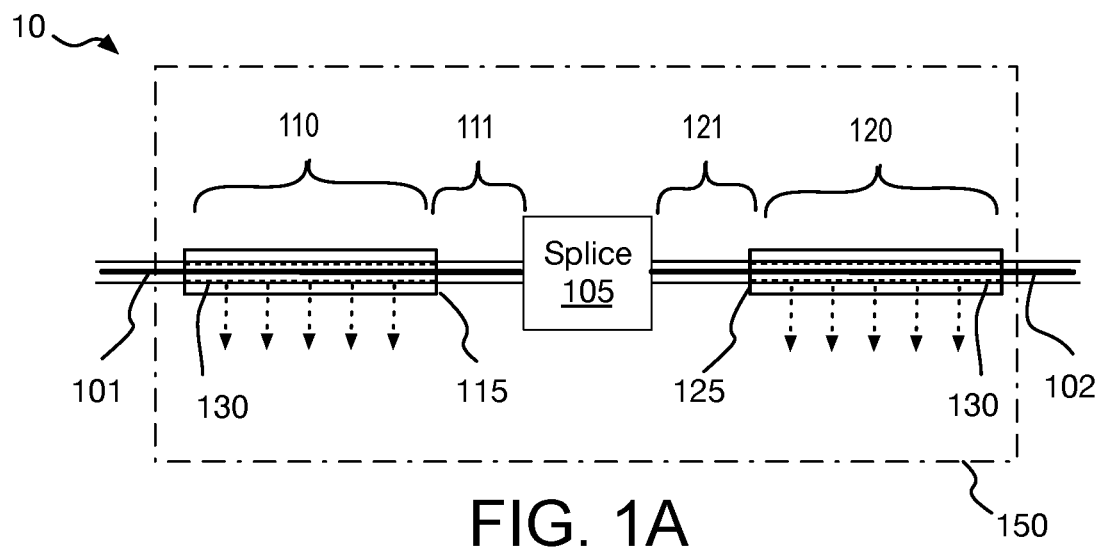
FIG. 1A illustrates an exemplary fiber splice encapsulated by one or more cladding light strippers, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy.

Unless otherwise specified in the explicit context of their use, the terms "substantially equal," "about equal" and "approximately equal" mean that there is no more than incidental variation between among things so described. In the art, such variation is typically no more than +/−10% of a predetermined target value.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

Described herein are optical fibers, and systems including optical fibers, which have a splice that is encapsulated by one or more cladding light strippers. Encapsulating a splice with cladding light strippers in accordance with embodiments herein may, for example, improve the quality of a beam conveyed by the fibers and across the splice. The term "encapsulation" is employed herein to describe a fiber architecture where a CLS is located along a first length of fiber, on a first side of a splice, and along a second length of fiber, on a second (opposite) side of the splice. With a splice encapsulated by a CLS, the splice may be protected from cladding light entering the cladding from entry points on either side of the splice. Whereas such cladding light might otherwise be lost at the splice in an uncontrolled manner that might be detrimental (e.g., creating a hotspot at the splice, etc.), cladding light may instead be first removed from the system by the CLS. Furthermore, any beam defects induced by the splice can be removed by the CLS present within the fiber lengths that, for example, bookend the splice. For example, core light scattered by the splice into a length of fiber on one side or another of the splice may be removed by the corresponding CLS.

In accordance with some embodiments, a splice is located within a length of a cladding light stripper such that a length of fiber implementing a portion of the CLS is on either side of the splice. Alternatively, where two cladding light strippers are separated by one or more lengths of fiber that are not operable for stripping cladding light, the splice may be located within these one or more lengths between a first CLS and a second CLS.

FIG. 1A illustrates an optical fiber system 10 where a fiber splice 105 joins an optical fiber 101 to an optical fiber 102. Although optical fibers 101, 102 may be any optical fiber known in the art, in some exemplary embodiments, optical fibers 101 and 102 are both multi-clad optical fibers. In some further embodiments, each of optical fibers 101 and 102 is a double clad optical fiber. In other embodiments, at least one of optical fibers 101 and 102 is a triple clad optical fiber, and in some such embodiments, both of optical fibers 101 and 102 are a triple clad optical fiber. Additional cladding layers are also possible. Splice 105 may be any end-to-end joint between fibers 101 and 102. In some embodiments, splice 105 is a single fusion of two fiber-end faces that have compatible cleave angles (e.g., substantially orthogonal to the longitudinal fiber axis, or x-dimension in FIG. 1A) with the axis of a core of fiber 101 substantially aligned with the axis of a core of fiber 102. Splice 105 may comprise a finite end length of fiber 101 and end length of fiber 102 that lacks an outer cladding material, which for example may have been stripped away during a splicing process. Splice 105 may comprise an alternative outer cladding material (e.g., any splice protector), or comprise an outer cladding material (e.g., a recoat of substantially the same material employed as an outer coating in the nominal multi-clad fiber architecture). In some other embodiments, splice 105 comprises an optical connector (i.e., a fiber-to-fiber coupler) lacking an air gap between end faces of fibers 101 and 102, or a mechanical splice in which there is an air gap between end faces of fibers 101 and 102. Depending on the quality of splice 105, as well as the architectural similarity of fibers 101 and 102, more or less splice loss may occur at splice 105.

For optical fiber 101, a CLS 115 occupies a fiber length 110 on a first side of splice 105. Over fiber length 110, CLS 115 is to strip cladding light, as denoted by dashed arrows in FIG. 1A. For optical fiber 102, a CLS 125 occupies a fiber length 120 on a second side of splice 105, opposite the first side of splice 105. Over fiber length 120, CLS 125 is likewise to strip cladding light. Although a single splice 105 is illustrated in FIG. 1A, in other embodiments two or more splices are present between CLS 115 and 125.

It is generally desirable to remove cladding light gradually over a length of fiber (e.g., lengths 110 and 120), for example to control the density of power dissipation, and to provide sufficient heat sinking as stripped cladding light is predominantly converted to heat. Overheating the fiber or other components (e.g., ferrules, etc.) is typically undesirable. Some fiber system components have temperature limits below 100° C., and where an outer cladding comprises a polymer, the upper limit on continuous operating temperature can be less than 85° C., for example.

CLS 115 and CLS 125 may each have one or more materials or structures operable for removing (stripping) cladding light. CLS 115 and CLS 125 may each have any architecture suitable for stripping cladding light. CLS 115 and CLS 125 may each further comprise any suitable heat sink, such as but not limited to, a passive heat exchanger operable to transfer heat generated from cladding light to a fluid medium, such as ambient air or a liquid coolant. One exemplary heat exchanger includes a metallic block (see, e.g., an inner surface of housing 150) machined to interface with fiber lengths 110, 120. Over fiber length 110, CLS 115 is to allow cladding light to exit the inner cladding, and may advantageously further prevent such exit light from re-entering the inner cladding. Ideally, CLS 115 does not significantly perturb light propagating in a fiber core. CLS 125 is to similarly operate over fiber length 120. In some embodiments, CLS 125 has substantially the same architecture as CLS 115, and is therefore operable in substantially the same manner and to substantially the same effect. For such embodiments, CLS encapsulation of splice 105 is substantially symmetric about splice 105. For example, both CLS 115 and CLS 125 may employ the same technique, and/or materials, and/or structural features to remove the cladding light, and sink the associated thermal load. CLS 115 and CLS 125 may, for example, have substantially the same axial length (i.e., fiber length 110 is approximately equal to fiber length 120). In some other embodiments, CLS 115 and CLS 125 employ different stripping techniques, materials, and/or structural features to remove the cladding light with different efficiencies, and/or to sustain different power levels. CLS 115 and CLS 125 may have significantly different axial lengths (i.e., fiber length 110 is significantly longer than fiber length 120). Hence, while CLS 115 and CLS 125 serve to encapsulate splice 105, the encapsulation with respect to CLS architecture and performance may be symmetric about splice 105, but need not be.

In some embodiments, either, or both, of CLS 115 and CLS 125 comprise one or more materials operable to remove cladding light. In some such embodiments, a layer of a high-index material (e.g., exceeding the index of the inner cladding material, or exceeding the index of a material index-matched to the inner cladding material) is on the inner cladding (or index-matched material) within fiber length 110 (120). The high-index material is to have a suitable index contrast with the inner cladding (or index-matched material) to "un-guide" light propagating with the inner cladding. In some specific embodiments, the high-index material is a polymer, but other materials may also be employed to the same effect. Over fiber length 110 (120), CLS 115 (125) may utilize more than one high-index material, or the index may otherwise vary over fiber length 110 (120), for example to better distribute the thermal load. The high-index material, for example, may have an index that varies inversely as a function of temperature such that a portion of CLS 115 (125) that becomes hotter becomes less efficient at stripping the cladding light than another, cooler, portion.

In some embodiments, either, or both, of CLS 115 and CLS 125 comprise one or more structures operable to remove cladding light. In some such embodiments, an outer surface 130 of the inner cladding is roughened, scored, or otherwise patterned, to have features of any desired dimension that are suitable to scatter, reflect, refract and/or diffract light out of the inner cladding. Over fiber length 110 (120), CLS 115 (125) may utilize more than one structure on an outer surface of the inner cladding, or the structures may otherwise vary over fiber length 110 (120), for example to better distribute the thermal load. In some exemplary embodiments where the CLS 115 and CLS 125 each comprises structures in the inner cladding, the inner cladding is not further encapsulated in any outer cladding (e.g., CLS 115 and 125 lack a polymer).

Notably, the above CLS architectures are merely for illustration, and embodiments herein are equally well suited to other CLS architectures amenable to being configured with a fiber splice at least in the manners further exemplified herein.

As further shown in FIG. 1A, fiber length 110 is spaced apart from splice 105 by an intermediate fiber length 111. Fiber length 120 is likewise spaced apart from splice 105 by an intermediate fiber length 121. Within intermediate fiber lengths 111 and 121, fiber 101 and 102 have their respective nominal cladding architectures (e.g., multi-clad) such that cladding light may propagate within an inner cladding over intermediate fiber lengths 111 and 121. CLS 115 and CLS 125 are therefore two discrete cladding light strippers rather than separate portions of a single cladding light stripper that extends across splice 105. Each of the intermediate fiber lengths 111 and 121 is non-zero such that splice 105 is separated from CLS 115 by a fully clad fiber segment, and also separated from CLS 125 by a fully clad fiber segment. Although in the illustrated embodiment, intermediate fiber length 111 is substantially equal to intermediate fiber length 121, in other embodiments fiber length 111 is significantly different (e.g., longer or shorter) than fiber length 121. In the illustrated embodiment, CLS 115 is separated from CLS 125 by the sum of the intermediate fiber lengths 111 and 121, which may vary, for example from a few millimeters to tens of meters, for example. Intermediate fiber lengths 111 and 121 may be minimized, for example to reduce SRS or other effects within a fiber system. Or, as described further below, at least one of fiber lengths 111 and 121 may comprise a service loop of significant length that may, for example, facilitate fabrication and/or enhance serviceability of a fiber system.

Notably, in fiber system 10, between CLS 115 and 125 there is only fiber and splice 105 with no other system components intervening between splice 105 and the CLS encapsulation. While in other embodiments, one or more other system components might be located between splice 105 and the CLS 115 and/or CLS 125, encapsulation of a splice in accordance with embodiments herein is to be distinguished from systems that merely include two or more cladding light strippers located arbitrarily with respect to any particular fiber splice. In some embodiments, for example, fiber system 10 is enclosed within a housing 150 with fibers 101 and 102 exiting housing 150 and extending an arbitrary length outside of housing 150 to couple to various external destinations. As such, fiber system 10 may be implemented as a converter box, for example. Even where not enclosed within a single housing, embodiments herein can be expected to have cladding light strippers in close proximity to opposite sides of a splice. The length of fiber between CLS 115 and 125 may be limited to less than 10 m, for example, and advantageously less than 5 m.

Figure 1B:
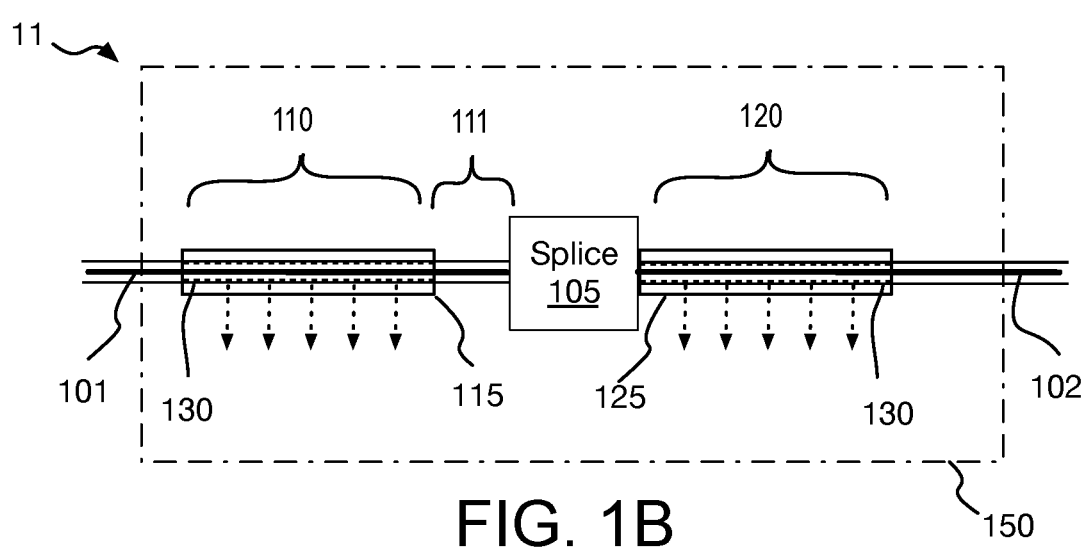
FIG. 1B illustrates an exemplary fiber splice encapsulated by one or more cladding light strippers, in accordance with some embodiments.

In some embodiments, a fiber splice is immediately adjacent to, or abutting a portion of an encapsulating CLS. For such embodiments, on at least one side of a splice there is no intermediate fiber length between the splice and a CLS. Integration of the splice and a CLS may, for example, reduce the fiber required for splice encapsulation and simplify system fabrication as an outer fiber cladding may be removed once in preparation for both splicing and forming the cladding light stripper. FIG. 1B is a schematic of a fiber system 11 that illustrates an example of a fiber splice encapsulated by one or more cladding light strippers, in accordance with some such embodiments. In system 11, features having the same reference as features introduced in the context of system 10 (FIG. 1A) may have any, or all, of the properties described above. As shown in FIG. 1B, splice 105 is again separated from CLS 115 by intermediate fiber length 111. However, splice 105 is continuous with CLS 125. System 11 therefore differs from system 10 (FIG. 1A) to the extent that intermediate length 121 is reduced to null, and splice 105 is at an end of CLS 125. With a non-zero intermediate fiber length 111, CLS 115 remains discrete from CLS 125. In alternative embodiments not depicted, splice 105 may likewise be separated from CLS 125 by intermediate fiber length 121 with intermediate length 111 instead reduced to null such that splice 105 is continuous with CLS 115.

Figure 1C:
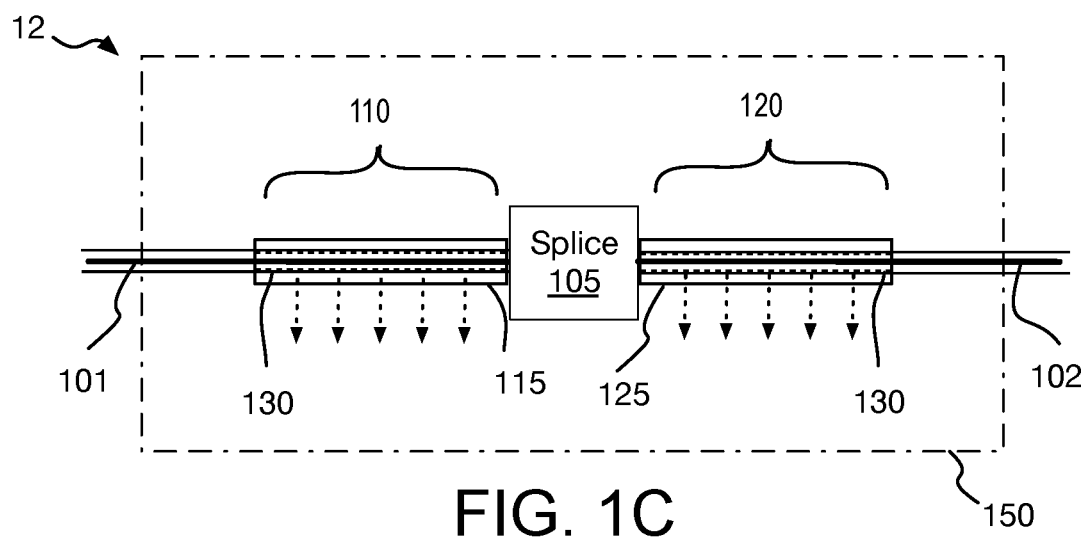
FIG. 1C illustrates an exemplary fiber splice encapsulated by one or more cladding light strippers, in accordance with some embodiments.

In some further embodiments, a fiber splice is immediately surrounded by an encapsulating CLS. For such embodiments, there is no intermediate fiber length between the CLS and either side of a splice. The splice is then essentially embedded within a single CLS rather than positioned between to discrete cladding light strippers. FIG. 1C is a schematic of a fiber system 12 that illustrates an example of a fiber splice encapsulated by one or more cladding light stripper, in accordance with some such embodiments. In system 12, features having the same reference as features introduced in the context of system 10 (FIG. 1A) may have any, or all, of the properties described above. As shown in FIG. 1C, splice 105 is continuous with CLS 115 and continuous with CLS 125. System 12 therefore differs from system 11 (FIG. 1B) to the extent that intermediate length 111 is reduced to null, and splice 105 is embedded within CLS 115 and CLS 125. For some embodiments where CLS 115 and CLS 125 have substantially the same architecture, splice 105 may be the only demarcation between CLS 115 and CLS 125 such that CLS 115 and CLS 125 may be considered merely separate lengths or portions of a single cladding light stripper. For other embodiments where CLS 115 and CLS 125 have differing architectures, CLS 115 and CLS 125 may still be considered two distinct cladding light strippers.

In some embodiments, a CLS encapsulated splice comprises a fiber transition in which a first fiber has a first architecture that is different from a second architecture of the second fiber. While any fiber structure or property may be transitioned at the splice, in some exemplary multi-clad fiber embodiments, at least one of a core dimension or an inner cladding dimension transitions at the splice. The dimensional differential may comprise either a step-up or step down in a diameter of one or both of the fiber core and inner cladding, for example.

FIG. 2A is a cross-sectional view of fiber 101 with the longitudinal fiber axis in the plane of the page, in accordance with some embodiments. FIG. 2B is a cross-sectional view of fiber 101 with the optical fiber axis perpendicular to the plane of the page, in accordance with some embodiments. Fiber 101 may have any refractive index profile (RIP) suitable for a multi-clad fiber. As used herein, the term "refractive-index profile" or "RIP" refers to the refractive index as a function of position along a line (e.g., x or y axis in FIG. 2B) or in a plane (e.g. x-y plane in FIG. 2B) perpendicular to the fiber axis (e.g., z-axis in FIG. 2A). In the example shown in FIGS. 2A and 2B, fiber 101 is azimuthally symmetric, in which case the ID RIP is identical for any azimuthal angle. Alternatively, for example as for birefringent fiber architectures, RIP may vary as a function of azimuthal angle.

In the example illustrated in FIGS. 2A and 2B, fiber 101 has a radially symmetric RIP with a central core 205, and an inner cladding 210, which is annular and encompasses core 205. Inner cladding 210 is surrounded by an annular outer cladding 215. Core 205, inner cladding 210, and outer cladding 215 can each have any RIP including but not limited to a step-index and graded-index. A "step-index fiber" has a RIP that is substantially flat (refractive index independent of position) within fiber core 205. Inner cladding 210 may also have a substantially flat RI over $D_{Clad,1}$, with a RIP of fiber 101 then being stepped at the interface between core 205 and inner cladding 210. An example of one illustrative stepped RIP suitable for a fiber laser is shown in FIG. 2A. Alternatively, one or more of core 205 and inner cladding 210 may have a "graded-index" in which the RI varies (e.g., decreases) with increasing radial position (i.e., with increasing distance from the core and/or cladding axis). Core 205 may be suitable for single-mode or multimode propagation of light. Inner cladding 210 may have an area larger than that of the core, may also have a higher NA (numerical aperture) and may support a large number of propagation modes. Core 205 and inner cladding 210 may have any suitable composition (e.g., glass). Outer cladding 215 may be a polymer or also glass, for example.

Although core 205 and inner cladding 210 is illustrated as being concentric (i.e., a centered core), it need not be. One or more of core 205 cladding 210 may also be a variety of shapes other than circular, such as, but not limited to annular, polygonal, arcuate, elliptical, or irregular. Core 205 and inner cladding 210 in the illustrated embodiments are co-axial, but may alternatively have axes offset with respect to one another. As shown in FIG. 2A, inner cladding 210 has a diameter $D_{Clad,1}$ while core 205 has a diameter $D_{Core,1}$. $D_{Clad,1}$ and $D_{Core,1}$ are illustrated to be constants about a central fiber axis in the longitudinal direction (z-axis in FIG. 2A). The diameters $D_{Clad,1}$ and $D_{Core,1}$ may instead vary over a longitudinal length of fiber 101. In some exemplary embodiments, fiber 101 is multi-mode (MM) fiber and the core diameter $D_{Core,1}$ is in the range of 10-100 micron (μm) and the inner cladding diameter $D_{Clad,1}$ is in the range of 200-1000 μm, although other values for each are possible.

FIG. 3A is a cross-sectional view of fiber 102 with the longitudinal fiber axis in the plane of the page, in accordance with some embodiments. FIG. 3B is a cross-sectional view of fiber 102 with the optical fiber axis perpendicular to the plane of the page, in accordance with some embodiments. As for fiber 101, fiber 102 may also have any RIP suitable for a multi-clad fiber. In the example shown in FIGS. 3A and 3B, fiber 102 has an RIP that is also azimuthally symmetric, although fiber 102 may alternatively have an RIP that varies as a function of azimuthal angle. In the illustrated example, fiber 102 has a radially symmetric RIP with a central core 305, and an inner cladding 310, which is annular and encompasses core 305. Inner cladding 310 is surrounded by an annular outer cladding 315. Core 305, inner cladding 310, and outer cladding 315, can each have any RIP including but not limited to step-index and graded-index. An illustrative stepped RIP shown in FIG. 3A is substantially the same as the stepped RIP of fiber 101. In fiber 102, core 305 and inner cladding 310 in the illustrated embodiments are again co-axial, but may also have axes offset with respect to one another, for example to match the axes of fiber 101. In fiber 102, core 205 and inner cladding 210 may have any suitable composition (e.g., glass). Outer cladding 215 may be a polymer or also glass, for example.

In some exemplary embodiments, the splice encapsulated by cladding light strippers is a differential splice in which at least one of the RIP, core diameter, or inner cladding diameters varies between fiber 101 and fiber 102. Core 305 has a core diameter $D_{Core,2}$ and cladding 310 has a cladding diameter $D_{Clad,2}$. One or both of $D_{Core,1}$ and $D_{Clad,1}$ differs from $D_{Core,2}$ and $D_{Clad,2}$, respectively. In the example illustrated in FIGS. 3A and 3B, $D_{Core,1}$ is smaller than $D_{Core,2}$, and $D_{Clad,1}$ is larger than $D_{Clad,2}$. In some exemplary embodiments where fiber 101 is MM fiber, fiber 102 is also MM fiber. In some such embodiments, the core diameter $D_{Core,2}$ is also in the range of 10-100 micron (μm), and the inner cladding diameter $D_{Clad,2}$ is also in the range of 200-1000 μm, although other values for each is possible. In some specific embodiments where $D_{Core,1}$ is less than 50 μm, $D_{Core,2}$ is greater than 50 μm. In some such embodiments where $D_{Clad,1}$ is more than 400 μm, $D_{Clad,2}$ is less than 400 μm.

Figure 4A:
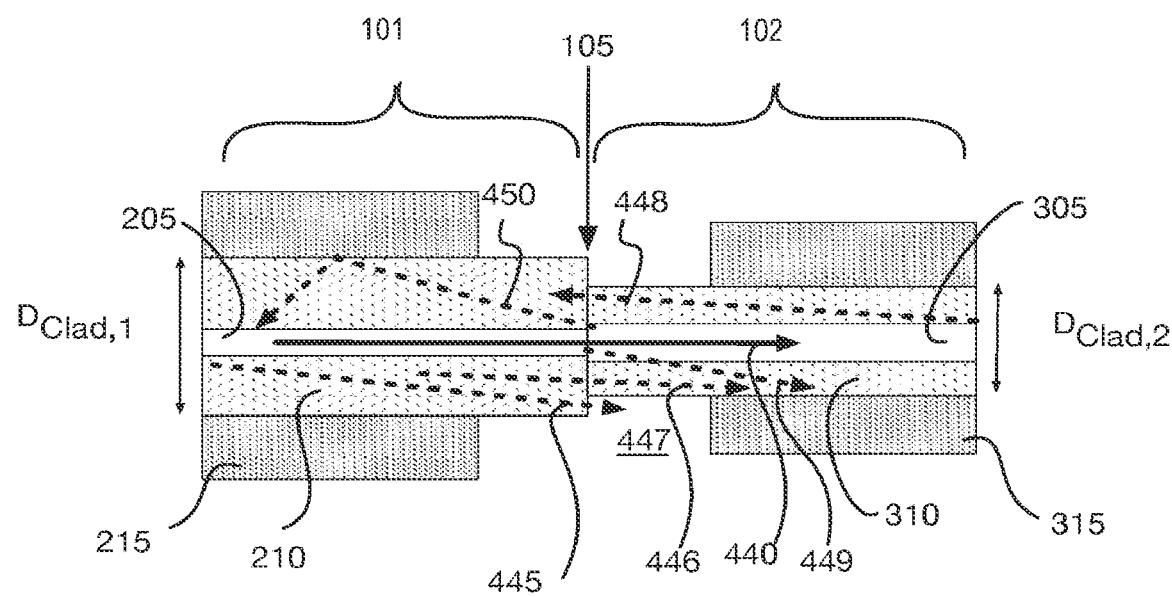
FIG. 4A depicts a cross-sectional view of a differential fiber splice between two optical fibers having different architectures.

FIG. 4A further depicts a cross-sectional view of an exemplary fiber splice where there is a differential cladding splice (e.g., $D_{Clad,1}$ is different than $D_{Clad,2}$) between optical fiber 101 and 102, each having the architecture introduced above in the context of FIG. 2A-3B. As shown in FIG. 4A, assuming a beam 440 propagating in the cores 205, 305 has a left-to-right reference direction as indicated by the heavy arrow, splice 105 may be considered a step-down fiber transition from fiber 101 (having the larger cladding diameter) to fiber 102 (having the smaller cladding diameter). Absent an encapsulating CLS in accordance with embodiments herein, a portion of cladding light 445 propagating within cladding 210 can continue propagating within cladding 310 as cladding light 446. With the step-down transition, a portion of cladding light 445 can also dissipate at splice 105, as splice loss 447, which may not be well controlled. Absent an encapsulating CLS in accordance with embodiments herein, cladding light 448 propagating within cladding 310 can also be expected to enter cladding 210, contributing to cladding light propagating in cladding 205. Splice 105 may further induce some of core light 440 to enter cladding 310 as cladding light 449 and where $D_{Core,1}$ is less than $D_{Core,2}$, some portion of core light propagating in core 305 (e.g., back reflected from down stream of splice 105), may enter cladding 210 as additional cladding light 450.

Figure 4B:
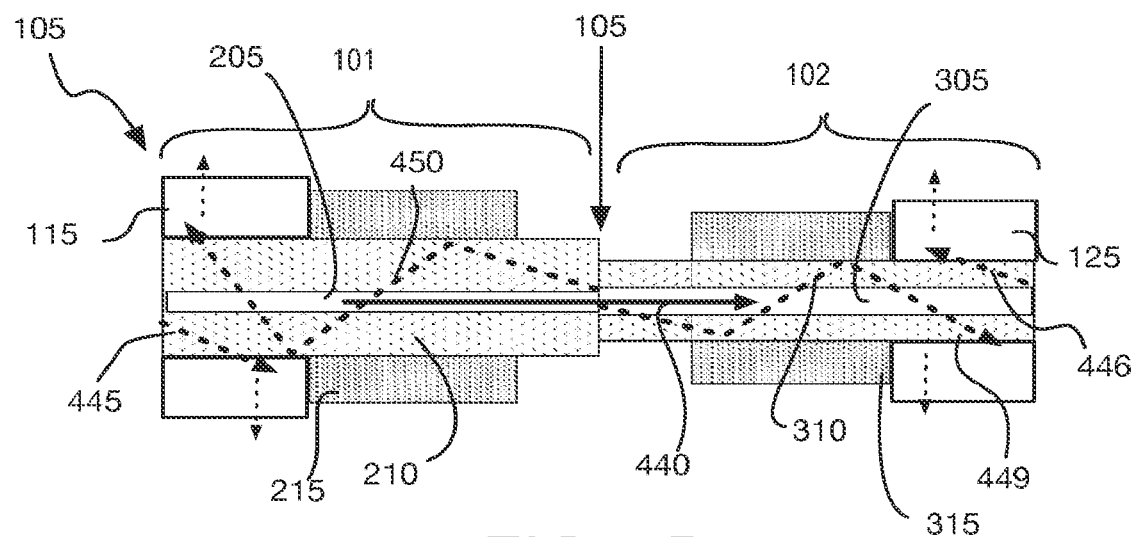
FIG. 4B depicts a cross-sectional view of a differential fiber splice between two optical fibers having different architectures encapsulated by one or more cladding light strippers, in accordance with some embodiments.

FIG. 4B further depicts a cross-sectional view of fiber splice 105 in the presence of the encapsulating CLS 115 and 125, in accordance with some embodiments. As shown, cladding light 445, 446 is stripped by CLS 115, 125, respectively, thereby reducing cladding light traversing splice 105. Also, core light entering cladding at splice 105 (e.g., cladding light 449 and/or 450) can be similarly stripped by CLS 125 and 115, respectively. As such, CLS encapsulation of splice 105 may improve beam quality and/or improve thermal management at splice 105.

FIG. 5 is a schematic of a fiber system 501 including cladding light strippers 115 and 125 on opposite sides of splice 105 between two optical fibers of different architectures, in accordance with some embodiments. Fiber system 501 includes fibers 101 and 102, which have any, or all, of the features described above. For example, fibers 101 and 102 may have different core and/or cladding diameters, such as the step-down differential cladding splice described in the context of FIG. 4A and FIG. 4B. As further illustrated in FIG. 5, system 501 includes all optical input to receive an optical beam that is to propagate within a core of fiber 101. CLS 115 comprises fiber length 505, and between splice 105 and CLS 115 is an intermediate length of fiber reserved as a service loop 555. Fiber 101 terminates at splice 105 joining an end of fiber length 510. CLS 125 comprises fiber length 510 such that CLS 125 is integrated with splice 105. Fiber 102 further includes a second service loop 565 between CLS 125 and an optical output that is to output the optical beam propagating within a core of fiber 102.

Service loop 555, for example, may be operable as a buffer of fiber length downstream of CLS 115, more or less of which may be consumed to implement splice 105. Service loop 555, may have a length less than 5 m (e.g., 1-3 m), for example. To achieve a desired fiber transition quality, splice 105 may be formed one or more times prior to placing fiber system 501 in the field, and as a result, more or less of service loop 555 may be consumed without impacting CLS 115. Positioning splice 105 at an end of CLS 125 rather than introducing a second service loop between splice 105 and an end of CLS 125 may advantageously avoid incurring additional fiber buffer length associated with fiber 102 on the second side of splice 105.

One or more CLS may be formed prior to, concurrently with, or subsequent to, implementing a fiber splice. FIG. 6A is a block diagram illustrating methods 601 of splicing two optical fibers, in accordance with some embodiments. Methods 601 begin at block 602 where a first fiber is received. The first fiber (e.g., fiber 101 in FIG. 5) may comprise a first CLS (e.g., CLS 115) separated from an end of the first fiber (e.g., by service loop 555). Upstream of methods 601, the first CLS may be formed in the first fiber according to any suitable technique as a function of the desired CLS architecture, and then the first fiber is truncated some predetermined distance (e.g., 1-3 m) suitable for a splice buffer (e.g., service loop 555). In some further embodiments, the first CLS is formed by exposing an inner cladding layer by removing an outer cladding layer surrounding the inner cladding layer along a first length of the first fiber. One or more materials may then be applied over the exposed inner cladding layer. Alternatively, one or more structures may be formed in the inner cladding layer, the structures operable to remove cladding light propagating in the inner cladding layer.

Methods 601 continue at block 604 where a second fiber (e.g., fiber 102 in FIG. 5) is received. At block 606, ends of the first and second fiber are spliced according to any suitable technique (e.g., fusion). Once the splice (e.g., splice 105) is completed satisfactorily, methods 601 continue at block 608, where a second CLS (e.g., CLS 125) is formed beginning at the splice and extending over a length of the second fiber. In some further embodiments, the second CLS is formed by exposing an inner cladding layer by removing an outer cladding layer surrounding the inner cladding layer along a second length of the first fiber. One or more materials may then be applied over the exposed inner cladding layer. Alternatively, one or more structures may be formed in the inner cladding layer using any suitable technique(s), the structures operable to remove cladding light propagating in the inner cladding layer.

FIG. 6B is a block diagram illustrating methods 651 of splicing two optical fibers, in accordance with some embodiments. Methods 651 begin at block 652 where a first fiber is received. The first fiber (e.g., fiber 101 in FIG. 5) may not yet comprise a first CLS (e.g., CLS 115) and the first fiber. The first fiber may include some length (e.g., 1-3 m) suitable for a splice buffer (e.g., service loop 555). Methods 651 continue at block 654 where a second fiber (e.g., fiber 102 in FIG. 5) is received. At block 656, ends of the first and second fiber are spliced according to any suitable technique (e.g., fusion). Once the splice (e.g., splice 105) is completed satisfactorily, methods 651 continue at block 658, where a first CLS (e.g., CLS 115) and a second CLS (e.g., CLS 125)

are formed on opposite sides of the splice. The CLS may be formed in the first and second fibers according to any suitable technique as a function of the desired CLS architecture. In some further embodiments, a first CLS and a second CLS is formed by exposing an inner cladding layer (e.g., through removal of an outer cladding layer surrounding the inner cladding layer) along a first length of the first fiber, and a second length of the second fiber, respectively. Removal of the outer cladding may have been performed as part of block 656 to facilitate splicing. At block 658 one or more materials may then be applied over the exposed inner cladding layer within the first and second lengths of fiber. Alternatively, one or more structures may be formed in the exposed inner cladding layer using any suitable technique(s), the structures operable to remove cladding light propagating in the inner cladding layer.

Any suitable fiber processing may be performed downstream of methods 601 or 651, for example to couple fiber 102 to a process head in embodiments where fiber 102 is to be a delivery fiber of a fiber laser processing system.

Figure 7:
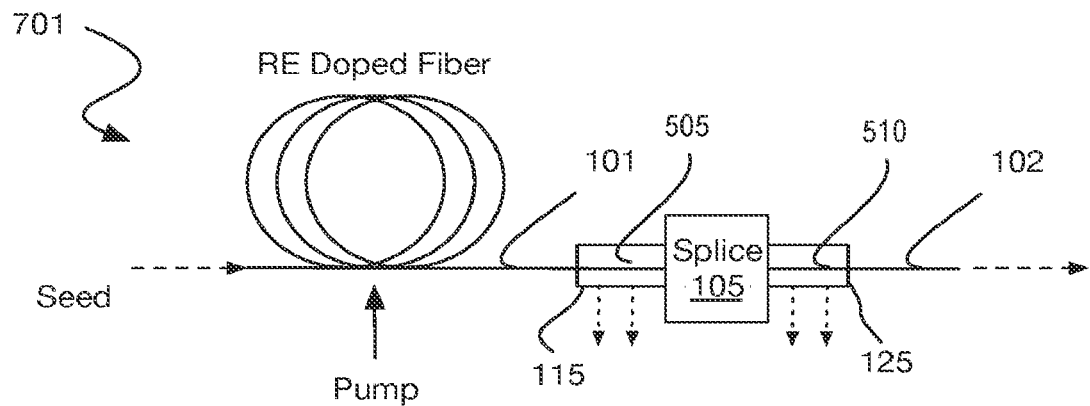
FIG. 7 is a schematic of a material processing fiber laser system including a cladding light stripper (CLS) on both sides of a splice that is between a laser and a process head, in accordance with some embodiments.

FIG. 7 is a schematic of a multimode fiber laser processing system 701 according to some embodiments. In FIG. 7, system 701 includes a first fiber 101 that includes an active length. A seed light source is coupled to fiber 101, for example at input coupler. The seed light source may be, for example, a diode pumped solid-state laser, a quantum cascade laser, a passively q-switched laser, a diode laser, a mode-locked laser, a fiber laser, or a combination thereof. The seed light source may be operable for any of continuous wave output, pulsed output, or a wavelength chirped pulsed output, for example. As one specific example, the seed light source is a Nd:YAG laser.

With the active length of fiber 101, rare-earth dopant(s) are present, for example within a core of the fiber, such that there is an optical gain spectrum that at least partially overlaps the spectrum of the seed light source. For example, Ytterbium may be used as a rare-earth dopant suitable for a seed laser source including wavelengths between 1030 nm and 1090 nm. In other embodiments, other rare-earth dopants can be used. In some exemplary embodiments, fiber 101 is a double clad fiber where the seed light is amplified in the core by pump light that is propagated within an inner cladding surrounding the core. The optical pump has an output spectrum that at least partially overlaps the absorption spectrum of active length of fiber 101. For example, where Ytterbium is chosen as the rare-earth dopant, the optical pump may be a fiber-coupled laser diode operable to emit near 976 nanometers. The output from optical pump source may be optically coupled to the active length of fiber 101 with any known pump combiner. The pump may be operable in a counter-propagating configuration, or may be introduced upstream of the active length of fiber 101 such that light from the seed light source and the pump light are co-propagating within the active length of fiber 101, for example.

In some exemplary embodiments, fiber 101 is coupled to fiber 102, which is operable as a delivery fiber to be further coupled to a process head. In some embodiments, fiber 101 and fiber 102 are coupled by a splice 105 that is encapsulated by a CLS that comprises both a fiber length 505 on a first side of splice 105, and a fiber length 510 on a second side of splice 105, for example according to parameters described elsewhere herein. In some other exemplary embodiments, fiber 101 is coupled to fiber 102, which is to be further coupled to a signal combiner, for example where multiple fiber lasers are combined to increase an output power level.

Figure 8:
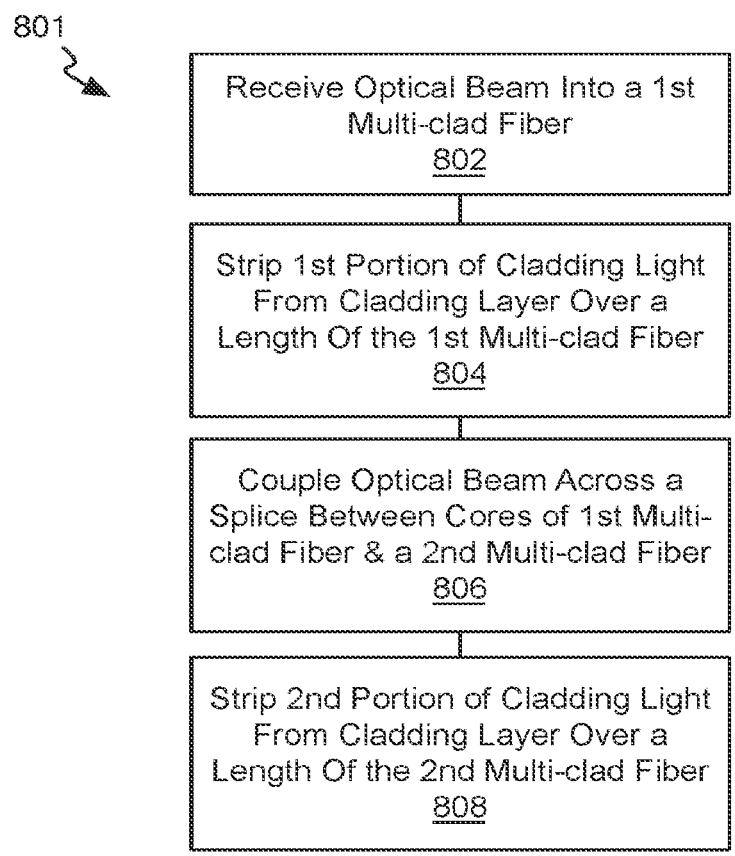
FIG. 8 is a block diagram illustrating methods of operating a fiber system including a cladding light stripper (CLS) on both sides of a splice, in accordance with some embodiments.

FIG. 8 is a block diagram illustrating methods 801 for operating a fiber system including a cladding light stripper (CLS) on both sides of a splice, in accordance with some embodiments. Methods 801 may be performed during operation of a suitable fiber system, such as fiber laser processing system 701 (FIG. 7). Methods 801 begin at block 802 where an optical beam is received into a first fiber. In exemplary embodiments, the beam is received into a multi-clad fiber (e.g., fiber 101 of FIG. 7). At block 804, a first portion of cladding light is stripped from a cladding layer of the first fiber using any suitable CLS comprising a length of the first fiber. At block 806, the optical beam is coupled across a splice between cores of the first fiber and a second fiber. In exemplary embodiments, the beam is coupled into a second multi-clad fiber (e.g., fiber 102 of FIG. 7), which may have at least another inner cladding layer of a different diameter. Methods 801 continue at block 808 where a second portion of cladding light is stripped from a cladding layer of the second fiber using any suitable CLS comprising a length of the second fiber.

In some embodiments, for example where the splice is a differential cladding splice, block 804 further comprises stripping light from the inner cladding layer along the first length of fiber that entered from the second length of fiber (e.g., back-reflected). In some further embodiments, for example where the splice is a differential core splice, block 808 further comprises stripping a portion of the optical beam from the inner cladding layer along the second length of fiber that propagated through the core within the first length of fiber.

Methods 801 may be followed with any suitable methods, such as, but not limited to, delivering the optical beam from the second multi-clad fiber in any manner suitable for a given application (e.g., optical telecommunications, materials processing, chemical or physical sensing, medical or biological applications).

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed.

What is claimed is:

1. A cladding light stripper (CLS) system, comprising:
   a first multi-clad fiber providing a first length of fiber having a first cladding, the first cladding including a first outer diameter;
   a second multi-clad fiber providing a second length of fiber having a second cladding, the second cladding including a second outer diameter that is different from the first outer diameter, the second multi-clad fiber including outer surface structures formed in the second cladding and configured to strip light therefrom; and
   a splice coupling the first length of fiber on a first side of the splice to the second length of fiber on a second side of the splice, in which the splice establishes a stepdown cladding having a glass-air interface between the first outer diameter and the second outer diameter, in which the glass-air interface is configured to direct cladding light away from the splice, wherein the outer surface structures are configured to strip core light scattered by the splice and entering the second cladding at the splice.

2. The CLS system of claim 1, wherein:
the first multi-clad fiber comprises a first core of a first core diameter;
the second multi-clad fiber comprises a second core of a second core diameter; and
the first and second core diameters are different from each other.

3. The CLS system of claim 1, wherein:
the first multi-clad fiber comprises a first core of a first core diameter;
the second multi-clad fiber comprises a second core of a second core diameter; and
the first and second core diameters are the same.

4. The CLS of claim 1, wherein:
the first cladding includes a first inner diameter;
the second cladding includes a second inner diameter; and
the first and second inner diameters are the same.

5. The CLS system of claim 1, wherein:
the first cladding includes a first inner diameter;
the second cladding includes a second inner diameter; and
the first and second inner diameters are different.

6. The CLS system of claim 1, wherein the first multi-clad fiber is a first double clad fiber and the second multi-clad fiber is a second double clad fiber.

7. The CLS system of claim 1, wherein the first and second cladding are inner cladding layers coupled by the splice.

8. The CLS system of claim 1, further comprising a CLS along the second length of multi-clad fiber, the second CLS configured to receive at least a portion of the cladding light.

9. The CLS system of claim 1, further comprising a CLS having one or more materials or structures within the first length of multi-clad fiber and within the second length of multi-clad fiber, the one or more materials or structures operable to remove cladding light out of the first and second lengths of multi-clad fiber.

10. The CLS of claim 9, wherein the CLS comprises one or more structures within the first length of multi-clad fiber and within the second length of multi-clad fiber, and wherein the structures comprise a cladding surrounding a core, the cladding surrounded by free space.

11. The CLS system of claim 9, wherein the one or more materials or structures are to guide or scatter cladding light out of the first and second lengths of multi-clad fiber.

12. The CLS system of claim 9, further comprising a housing to contain the CLS and the splice, wherein the first and the second lengths of multi-clad fiber exit the housing.

13. The CLS system of claim 1, wherein the first length of multi-clad fiber is between the splice and a laser, and the second length of multi-clad fiber is between the splice and a delivery fiber.

14. The CLS system of claim 1, wherein the first length of multi-clad fiber is between the splice and a laser, and the second length of multi-clad fiber is between the splice and a signal combiner.

15. A laser system including the CLS system of claim 1, the laser system further comprising a source laser coupled to the first multi-clad fiber.

16. The laser system of claim 15, wherein the source laser has a power output of at least 3 KW.

17. The CLS system of claim 1, further comprising a heat exchanger configured to transfer heat from the cladding light directed away from the splice and the light stripped from the second cladding.

18. A method of splicing two multi-clad fibers, the method comprising:
receiving a first of the fibers having a first end, wherein the first fiber has a first cladding of a first outer diameter;
receiving a second of the fibers having a second end, wherein the second fiber has a second cladding of a second outer diameter;
forming outer surface structures in the second cladding to configure the outer surface structures to strip cladding light from the second fiber;
joining the first end to the second end at a splice to establish a stepdown cladding having a glass-air interface between the first outer diameter and the second outer diameter, wherein the glass-air interface is configured to direct cladding light away from the splice; and
forming a cladding light stripper (CLS) including the splice and the outer surface structures, and wherein the outer surface structures are configured to strip core light scattered by the splice and entering the second cladding at the splice.

19. The method of claim 18, wherein forming the CLS further comprises:
exposing an inner cladding layer by removing an outer cladding layer surrounding the inner cladding layer along the first length and along the second length; and
forming one or more structures in the inner cladding layer, operable to remove cladding light.

20. The method of claim 18, wherein the first and second fibers have the same core sizes.

21. The method of claim 18, wherein the first and second fibers are double clad fibers.

22. The method of claim 18, further comprising housing the CLS with a heat exchanger configured to transfer heat from the cladding light directed away from the splice and the cladding light stripped from the second cladding.

* * * * *